United States Patent
Faase et al.

(10) Patent No.: US 7,199,916 B2
(45) Date of Patent: Apr. 3, 2007

(54) LIGHT MODULATOR DEVICE

(75) Inventors: Kenneth J. Faase, Corvallis, OR (US); Michael G. Monroe, Corvallis, OR (US); Eric L Nikkel, Philomath, OR (US); Arthur R. Piehl, Corvallis, OR (US); James R. Przybyla, Philomath, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 143 days.

(21) Appl. No.: 11/007,562

(22) Filed: Dec. 7, 2004

(65) Prior Publication Data

US 2006/0119922 A1 Jun. 8, 2006

(51) Int. Cl.
*G02B 26/00* (2006.01)
(52) U.S. Cl. .............. 359/290; 359/291; 359/292
(58) Field of Classification Search ............ 359/291, 359/292, 295, 298, 223, 224, 330, 332, 290
See application file for complete search history.

(56) References Cited

U.S. PATENT DOCUMENTS

| | | | |
|---|---|---|---|
| 5,600,383 A * | 2/1997 | Hornbeck | 348/771 |
| 6,195,196 B1 | 2/2001 | Kimura et al. | |
| 6,642,913 B1 * | 11/2003 | Kimura et al. | 345/84 |
| 6,906,848 B2 * | 6/2005 | Aubuchon | 359/291 |
| 2001/0043171 A1 | 11/2001 | Van Gorkom | |
| 2002/0054424 A1 | 5/2002 | Miles | |

FOREIGN PATENT DOCUMENTS

| | | |
|---|---|---|
| EP | 0 469 293 A | 2/1992 |
| EP | 1 473 581 A | 11/2004 |

* cited by examiner

*Primary Examiner*—Hung Xuan Dang
*Assistant Examiner*—Tuyen Tra

(57) ABSTRACT

A light modulator device includes a bottom charge plate; a pixel plate supported by at least one flexure, wherein the flexure is located substantially below said pixel plate, and a top charge plate.

28 Claims, 15 Drawing Sheets

LIGHT MODULATOR DEVICE

BACKGROUND

Micro-electromechanical systems (MEMS) are used in a variety of applications such as optical display systems. Such MEMS devices have been developed using a variety of approaches. In the case of light modulator devices, the device converts white light into color light through Fabry-Perot interference between a variable height, partially reflecting pixel plate, and a fixed reflector bottom plate. The gap between the pixel plate and bottom reflector is controlled by a balance of forces between an electrostatic field and elastic deformation of pixel flexures.

The electrostatic field is produced by a voltage or charge difference between the conductive pixel plate and the conductive bottom capacitor plate. The electrostatic field pulls the pixel plate towards the bottom capacitor plate. Frequently, long, thin flexures span between fixed posts and the pixel plate. These flexures deform elastically as the pixel plate is electrostatically attracted to the bottom plate capacitor. When the voltage or charge difference between the pixel plate and bottom plate capacitor is removed, the stored elastic energy in the flexures returns the pixel plate to its original position.

To maximize the optical efficiency of the original Fabry-Perot device, the interconnect vias are stacked on top of each other to reduce their footprint on the bottom reflector level. Stacked vias are generally not considered a best practice for Integrated Circuit (IC) design and manufacturability, because the aspect ratio of the holes can increase beyond the ability to properly fill and clear.

SUMMARY

A light modulator device includes a bottom charge plate, a pixel plate supported by at least one flexure, wherein the flexure is located substantially below said pixel plate and a top charge plate.

BRIEF DESCRIPTION OF THE DRAWINGS

The accompanying drawings illustrate various embodiments of the present apparatus and method and are a part of the specification. The illustrated embodiments are merely examples of the present apparatus and method and do not limit the scope of the disclosure.

Throughout the drawings, identical reference numbers designate similar, but not necessarily identical, elements.

DETAILED DESCRIPTION

Micro-electro mechanical (MEM) light modulator devices are provided herein that have relatively large aperture ratios. The aperture ratio of a light modulator device is the ratio of the usable pixel area to the total pixel area. Some of the light modulator devices described herein include optical and electrostatic gaps that are separated. The separation of the optical and electrostatic gap allows additional flexibility and device performance enhancements in the light modulator devices.

This configuration also allows for more degrees of freedom in the flexure design and for a higher aperture ratio. Increased aperture ratio may increase the optical performance of the device. In addition, such a configuration allows for the use of longer flexures for a given pixel size. Longer flexures may provide lower flexure strain designs that can provide higher reliability and require lower actuation voltage. The lower strain, lower activation voltage designs enable smaller pixel sizes that can lead to lower cost devices. Finally, moving the flexures out of the between the adjacent devices reduces the possibility of flexure to pixel contact binding.

Other light modulator devices described herein make use of multi-part movable pixel plates. These pixel plates generally include a movable pixel member and a pixel extension member. The pixel extension member increases the aperture ratio of such a light modulator device.

A display system will first be discussed, followed by a general discussion of a light modulator device that includes flexures that are located substantially below the pixel plate. Thereafter, a light modulator device will be discussed according to one exemplary embodiment, including a method of forming such a device. Thereafter, several other exemplary light modulator devices will be discussed, including light modulator devices according to other exemplary embodiments that include flexures and cutouts in the bottom charge plate, as well as pixel plates that include movable pixel members and pixel extension members.

In the following description, for purposes of explanation, numerous specific details are set forth in order to provide a thorough understanding of the present method and apparatus. It will be apparent, however, to one skilled in the art, that the present method and apparatus may be practiced without these specific details. Reference in the specification to "one embodiment" or "an embodiment" means that a particular feature, structure, or characteristic described in connection with the embodiment is included in at least one embodiment. The appearance of the phrase "in one embodiment" in various places in the specification are not necessarily all referring to the same embodiment.

Display System

Figure 1:
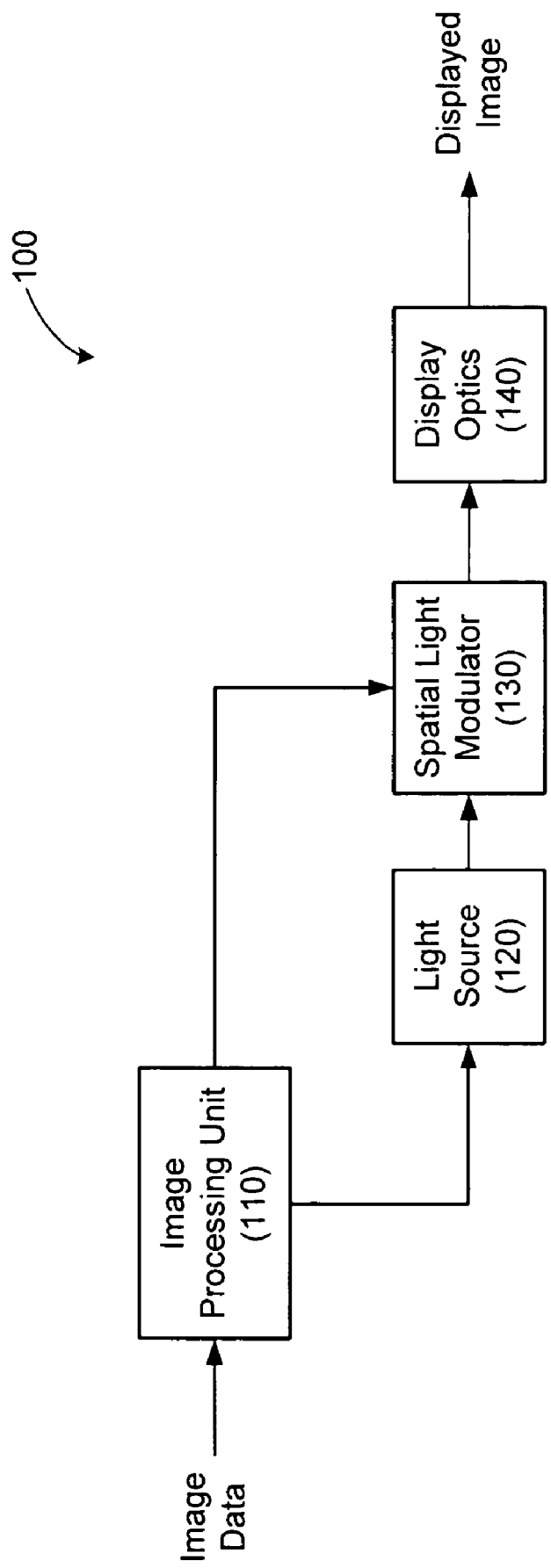
FIG. 1 illustrates a schematic diagram of a display system according to one exemplary embodiment.

FIG. 1 illustrates an exemplary display system (100). The components of FIG. 1 are exemplary only and may be modified or changed as best serves a particular application. As shown in FIG. 1, image data is input into an image processing unit (110). The image data defines an image that is to be displayed by the display system (100). While one image is illustrated and described as being processed by the image processing unit (110), it will be understood by one skilled in the art that a plurality or series of images may be processed by the image processing unit (110). The image processing unit (110) performs various functions including controlling the illumination of a light source (120) and controlling a spatial light modulator (SLM) (130). The SLM (130) will now be discussed in more detail.

The SLM (130) includes an array of micro-electro mechanical (MEM) light modulator devices, or pixels, which have optical cavities defined therein. Each optical cavity has an optical gap formed between two opposing reflectors. The size of the gap is controlled by balancing a spring force and an electrostatic force between the two reflectors. Light that enters each pixel is modulated or manipulated to achieve desired characteristics. These characteristics, which include the hues and intensities of the transmitted light, are manipulated by varying the gap between the reflectors. Further, as will be discussed in more detail below, the aperture ratio of each light modulator device is relatively large. This increase in the aperture ratio of each light modulator device increases the amount of light transmitted by each light modulator.

Returning to the operation of the display system (100) in general, the SLM (130) manipulates incoming light to form an image-bearing beam of light that is eventually displayed or cast by display optics (140) on a viewing surface (not shown). The display optics (140) may comprise any device configured to display or project an image. For example, the display optics (140) may be, but are not limited to, a lens configured to project and focus an image onto a viewing surface. The viewing surface may be, but is not limited to, a screen, television, wall, liquid crystal display (LCD), or computer monitor. The pixel structures described herein allow the size of the reflectors to be precisely controlled while minimizing or eliminating undesired contact between the two reflectors and/or other parts of the pixel. This control also includes the control of the black state of the pixel.

Light Modulator Device Having Separate Optical and Electrostatic Gaps

Figure 2:
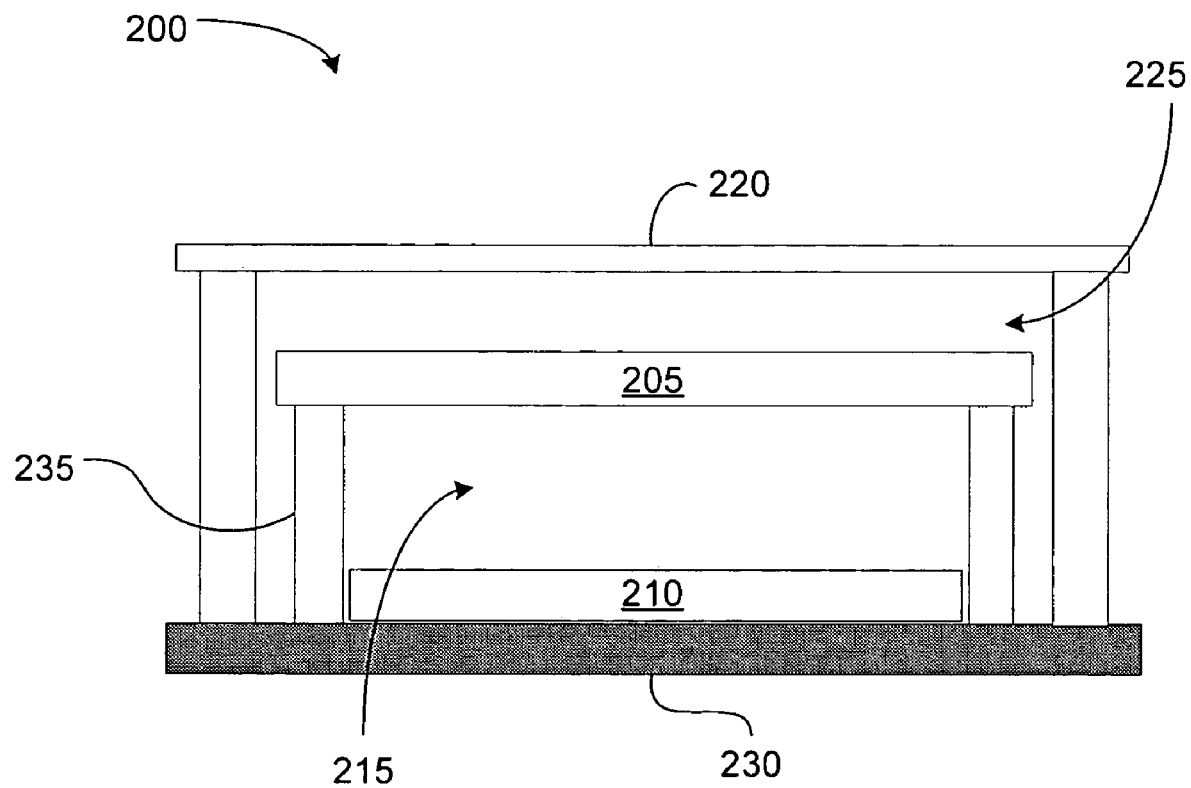
FIG. 2 illustrates a schematic diagram showing a hide flex pixel structure according to one exemplary embodiment.

FIG. 2 illustrates the operation of a single light modulator device. The light modulator device (200) includes a pixel plate (205) and a bottom charge plate (210) separated by an electrostatic gap (215). The light modulator device (200) also includes a top plate (220) that is separated from the pixel plate (205) by an optical gap (225). As will be discussed in more detail below, the pixel plate (205) occupies a relatively large percentage of the total top surface area of the light modulator device (200). For ease of reference, the surface area of the light modulator device will be discussed with reference to the surface area of the light modulator as viewed from above.

The light modulator device (200) is supported by a substrate (230). For example, a pixel support structure supports the pixel plate (205) and an outside support structure supports the top plate (220). The pixel support structure (205) includes a plurality of flexures (235). The flexures (235) are located substantially below the pixel plate (205). This configuration allows for an increase in the relative size of the pixel plate (205). In particular, the location of the flexures (235) substantially below the pixel plate (205) reduces the surface area of the light modulator device (200) that is occupied by flexures.

The light modulator device (200) shown functions as a Fabry-Perot light modulator. As a result, the pixel plate (205) is highly reflective while the top plate (220) is less reflective. A portion of a beam of light incident on the light modulator device (200) will be partially reflected by the top plate (220), while another portion of the beam of light will pass through the top plate (220) and into the optical gap (225).

Once the light enters the optical gap (225), it is bounced between the top plate (220) and the pixel plate (205). Each time the light inside the optical gap (225) becomes incident on the top plate (220), some portion of the light passes through the top plate (220) and escapes the light modulator device (200). The wavelengths of the light that are thus able to pass through the top plate (220) depend at least in part on the size of the optical gap (225). Accordingly, varying the size of the optical gap (225) controls the characteristics of light that exits the light modulator device (200).

The size of the optical gap (225) is controlled by movement of the pixel plate (205). The optical gap (225) of the light modulator device may be precisely controlled over a broad range of displacements, or an operating displacement range, while minimizing or eliminating contact between the pixel plate (205). This operational displacement range includes movement from a position to produce a black state response through positions for producing light of selected wavelengths within the visible spectrum.

As previously introduced, controlling the size of the optical gap (225) controls the output of the light modulator device (200). Further, as previously discussed, the size of the optical gap (225) shown depends, at least in part, on the size of the electrostatic gap (215).

Storing electrical charge on the plates (205, 210) varies the size of the optical gap (225), such that a desired wavelength at a desired intensity may be selected. The flexures (235) allow the electrostatic gap (215) to vary when charge is stored on the pixel plate (205) and the bottom charge plate (205). The charge stored results in an electrostatic force between the plates (205, 210), thereby drawing the pixel plate (205) toward the bottom charge plate (210). This force is opposed by the spring force associated with the deflection of the flexures (235).

When an electrostatic force exists between the plates (205, 210), the pixel plate (205) will continue to be drawn toward the bottom charge plate (210) until the spring force and the electrostatic force reach equilibrium. When these two forces reach equilibrium, the pixel plate (205) will be held in this position. Accordingly, the relative position of the pixel plate (205) with respect to the bottom charge plate (210) and the top plate (220) may be varied by the amount of charge applied to the plates (205, 210). Once the electrostatic force is released, such as by dissipating the accumulated charges, the spring force returns the flexures (235) to a neutral state position.

Several exemplary structures will be discussed herein that include flexures that are placed substantially below the pixel plate (205). An exemplary light modulator device will be discussed that makes use of the flexures located substantially below the pixel plate. The exemplary pixel plate, flexures, and support posts will then be discussed in more detail with reference to FIGS. 4 and 5. As will be discussed in more detail below, the separation of the optical gap and the electrostatic gap may further allow for more efficient formation of electrical connections. An exemplary method of forming of a light modulator device will then be discussed with reference to FIG. 6. Several other configurations will then be discussed with reference to FIGS. 7–10.

Exemplary Light Modulator Device

Figure 3:
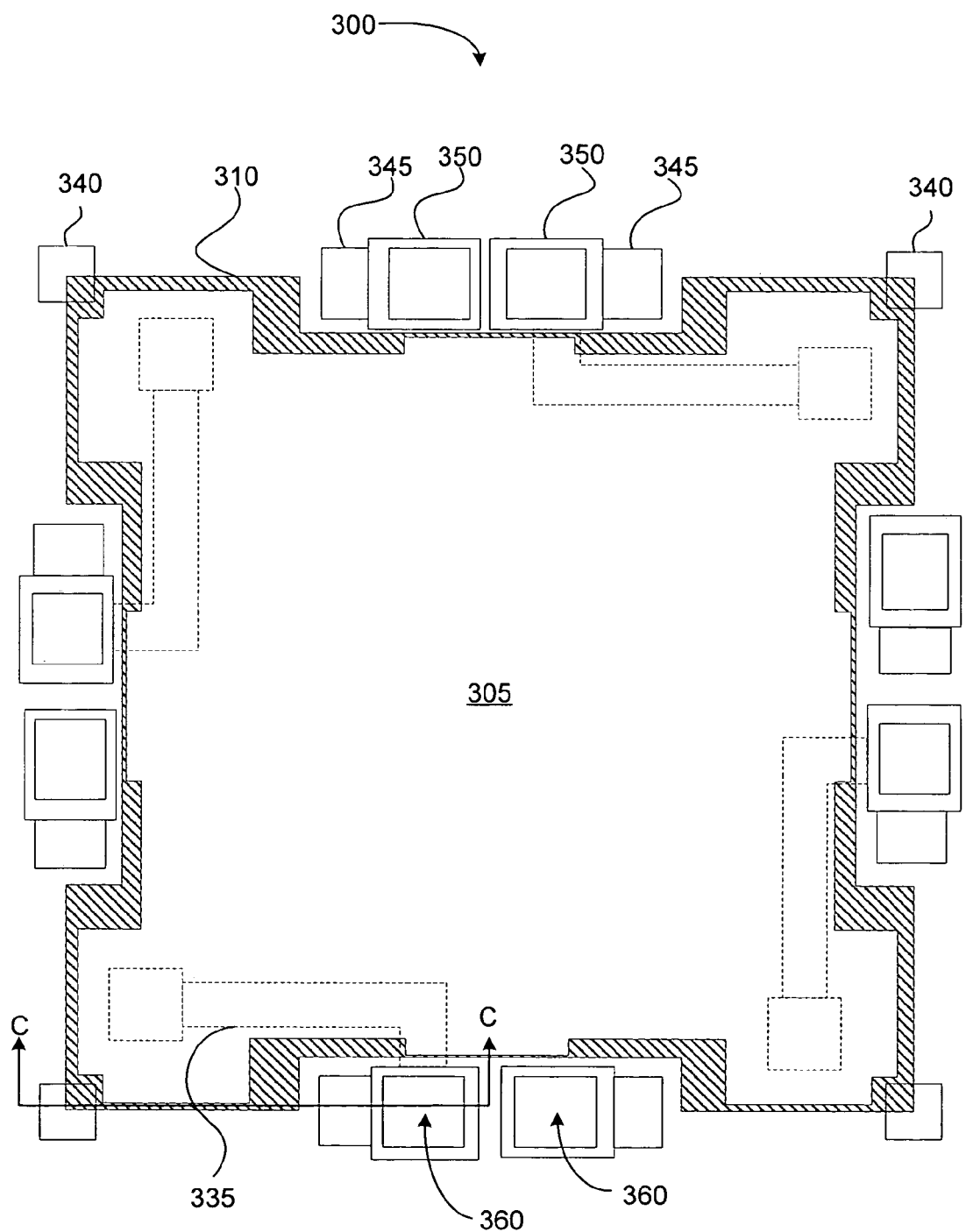
FIG. 3 illustrates a partial top view of a light modulator device having a hidden flexure structure.

FIG. 3 illustrates a top view of a light modulator device (300). For ease of reference, the top charge plate has been removed, but will be discussed in more detail with reference to FIGS. 5 and 6. The light modulator device (300) includes a plurality of flexures (335) that extend between the bottom charge plate (310) and the pixel plate (305). These flexures (335), which are arranged in a pinwheel pattern, are shown in dashed lines to emphasize that a substantial portion of the flexures (335) is located below the pixel plate (305). Accordingly, as shown in FIG. 3, the ratio of the surface area of the pixel plate to the total surface area of the light modulator to the device is relatively high. In particular, the ratio of the pixel plate (305) with respect to the entire light modulator device (300), which may be referred to as the aspect ratio, is approximately 0.70. As a result, the pixel plate (305) covers approximately 70% of the total surface area of the space it occupies in the light modulator device.

As previously discussed, the performance of the light modulator device (300) depends, at least in part, on the size of the pixel plate (305). Accordingly, the present configuration may increase the performance of the light modulator device (300) by increasing the relative size of the pixel plate (310) by placing the flexures (335) substantially below the pixel plate (310). The pixel plate (310) and flexures (335) will now be discussed in more detail with reference to FIGS. 4–5. By way of introduction, the light modulator device (300) includes a plurality of bottom plate vias (340), interconnect vias (345), flexure vias (350), and pixel plate vias (360). The configuration of the vias will be discussed in more detail with reference to FIG. 6.

Figure 4:
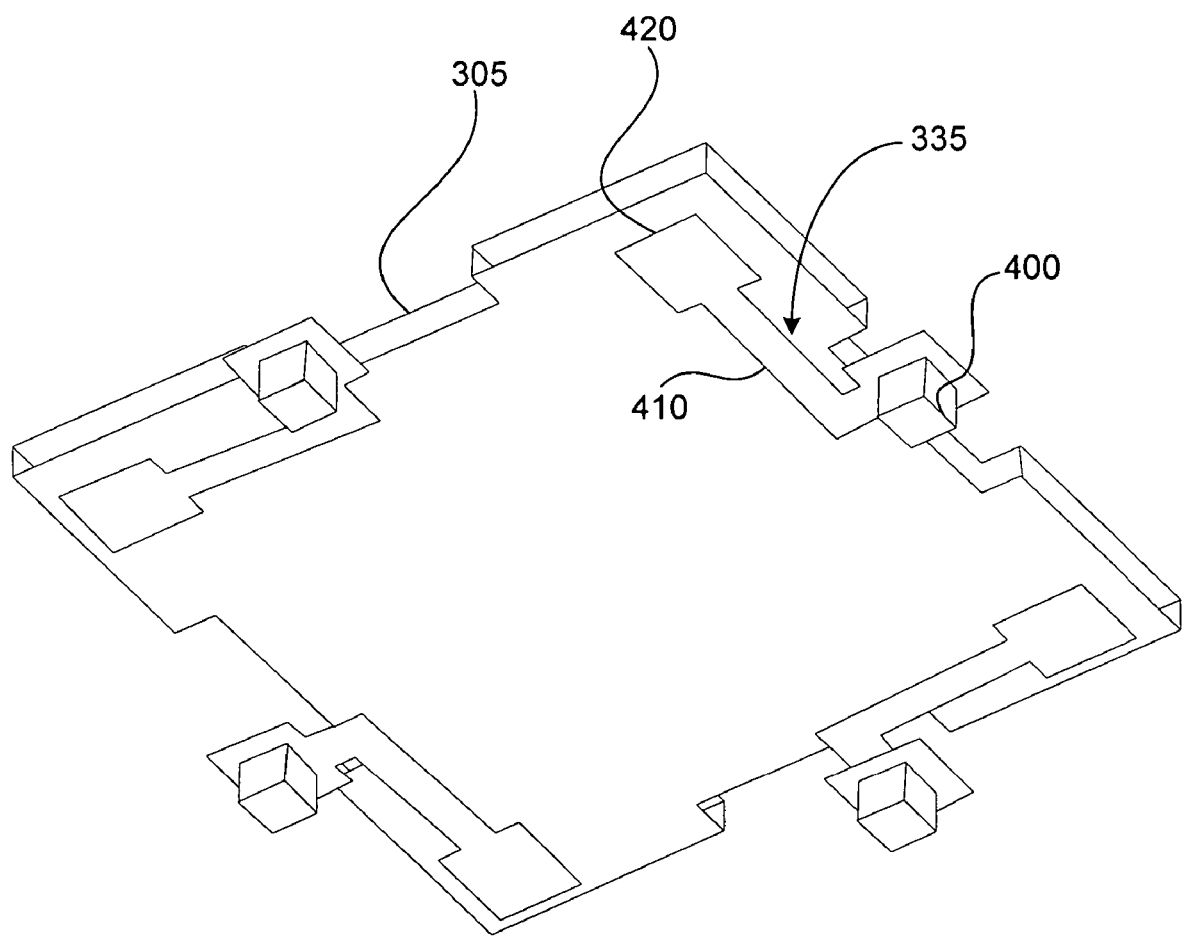
FIG. 4 illustrates a perspective view of a pixel plate and exemplary flexures and posts according to one exemplary embodiment.

FIG. 4 illustrates the pixel plate (305) and the flexures (335) isolated from the rest of the light modulator device (300). As shown in FIG. 4, the flexures (335) are coupled to a base mounting post (400), and include a span portion (410), and a pixel plate mounting portion (420). The base mounting portion (400) is secured to the interconnect vias (345; FIG. 3), and the pixel plate mounting portion (420) is secured to the pixel plate (305). The span portion (410) shown is approximately 5.4 µm in length by approximately 1.0 µm wide. This configuration allows the span portion (410) to deflect in response to the electrostatic forces discussed above. As the span portion (410) deflects, the amount of the space between the pixel plate (305) and the bottom charge plate (310; FIG. 3) changes. This space, which corresponds to an electrostatic gap, will now be discussed with reference to FIGS. 5A–B.

Figure 5A:
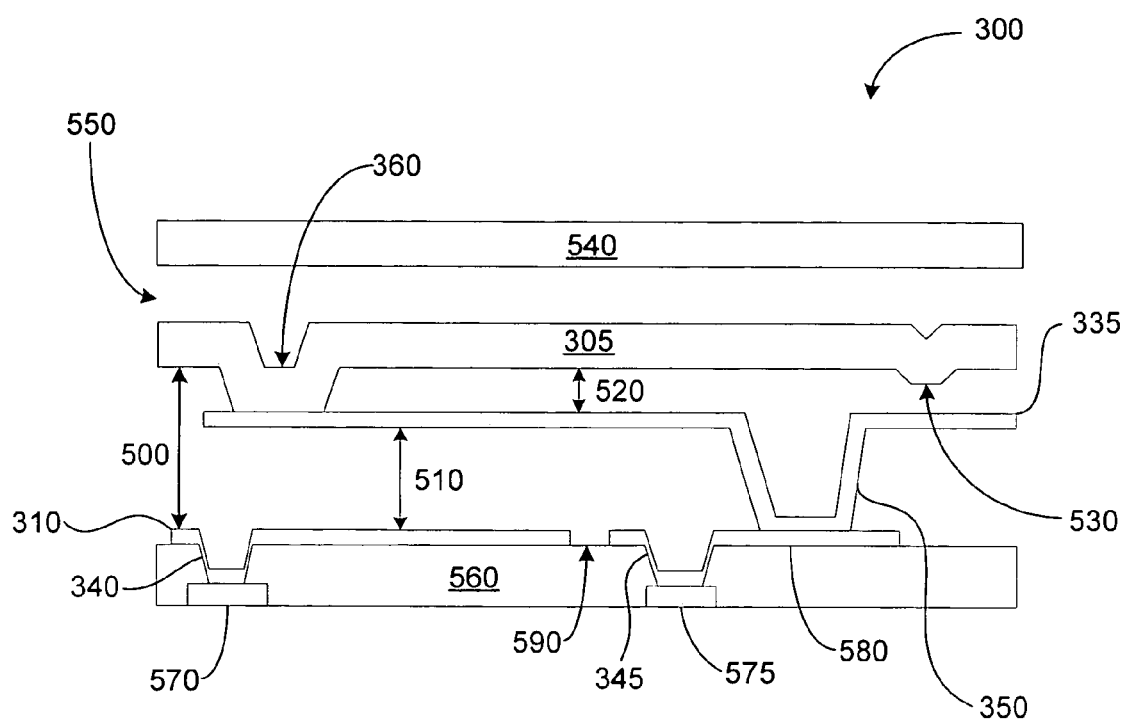
FIG. 5A illustrates a partial cutaway view of a light modulator device according to one exemplary embodiment.

The configuration of an electrostatic gap (500) is shown in more detail with reference to FIG. 5A, which is a partial cutaway view of the light modulator device (300; FIG. 3) taken along section C—C. As shown in FIG. 5A, an electrostatic gap (500) is defined between the pixel plate (305) and the bottom charge plate (310; FIG. 3). This electrostatic gap (500) includes a first sacrificial layer space (510) between the flexures (335) and the bottom charge plate (310) and a flexure space (520) between the pixel plate (305) and the flexure (335). As previously discussed, electrostatic charges are established on each of the pixel plate (305) and the bottom charge plate (310) to thereby draw the pixel plate (305) toward the bottom charge plate (310). As the pixel plate (305) is drawn toward the bottom charge plate (310), both the first sacrificial space (510) and the flexure space (520) become smaller. These spaces will continue to become smaller until either the pixel plate (305) contacts the flexure (335) and/or the flexure (335) contacts the bottom charge plate (310).

In FIG. 5A the flexure space (520) is smaller than the first sacrificial space (510). As a result, the pixel plate (305) will contact the flexure (335) before the flexure (335) contacts the bottom charge plate (310). This contact between the flexure (335) and the pixel plate (305) reduces charge trapping and arc welding stiction mechanisms. These effects may be further reduced by including a bump (530) between the flexure (335) and the pixel plate (305). In particular, in such a configuration the bump (530) is formed on the underside of the pixel plate (305). A plurality of such bumps is located over each of the base mounting posts (400; FIG. 4) to reduce these stiction mechanisms.

Figure 5B:
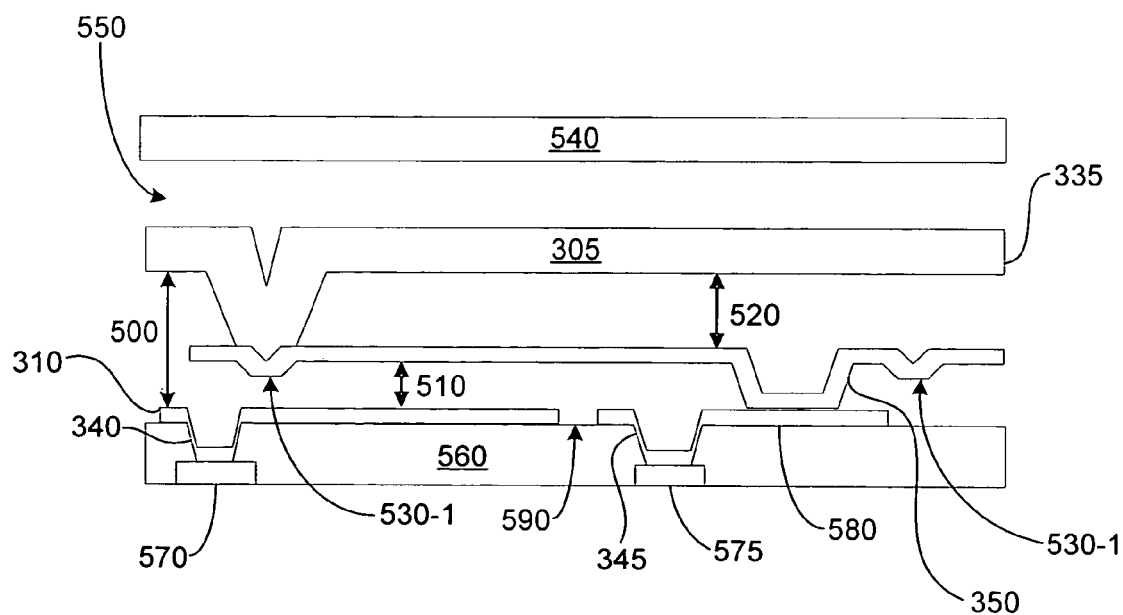
FIG. 5B illustrates a partial cutaway view of a light modulator device according to one exemplary embodiment.

In FIG. 5B, the flexure space (520) is larger than the first sacrificial space (510). In this instance, bumps (530-1) may be formed on the underside of the flexures (335), below the intersection of the flexure and the pixel plate (305). Accordingly, bumps may be provided either on the undersides of either the pixel plate (305) or the flexure (335), or both, to reduce stiction or other such effects.

In addition, the total initial electrostatic gap, which is the total distance between the pixel plate (305) and the bottom charge plate (310) while the pixel plate (305) is undeflected, may be sized to reduce the possibility that the pixel plate (305) will come into contact with the bottom charge plate (310). As previously introduced, in some configurations two electrodes, such as the pixel plate (305) and the bottom charge plate (310), that are drawn together by electrostatic forces may snap together in response to charge runaway. To minimize or eliminate this contact, the total initial electrostatic gap may be three times the total operational displacement range of the pixel plate (305).

Furthermore, FIGS. 5A–5B illustrate the top charge plate (540) in position over the pixel plate (305). The top charge plate (540) may be coupled to the same voltage level as the pixel plate (305) such that there is little or no electrostatic attraction between the top charge plate (540) and the pixel plate (305). FIGS. 5A–5B shows the pixel plate (305) in a neutral state position.

The neutral state position of the pixel plate (305) shown also corresponds to the black state position of the pixel plate (305) such that the optical gap (550) in this configuration is at its minimum size. More specifically, an optical gap (550), which is defined between the top charge plate (540) and the pixel plate (305), is approximately 100 nm. This electrostatic gap allows the light modulator device to absorb sufficient light to be in a black state. More specifically, the size of the optical gap (540) while the pixel plate (305) is in a black state position allows the light modulator device (305) to trap essentially all of the light that enters therein, such that the light modulator device produces a black output. As introduced, the black state position thus introduced may be considered as a default black state gap. This gap can be adjusted by controlling the size of the optical gap (550). Consequently, the light modulator device (300) may be reliably placed in its black state position by allowing the pixel plate (305) to return to its neutral state position.

Accordingly, flexures (335) may be located substantially underneath the pixel plate (305) to increase the ratio of the surface area of the pixel plate (305) to the top surface area of the light modulator device (300), thereby increasing the performance of the light modulator device (300). Further, the light modulator device (300) may be configured to operate while minimizing or eliminating contact between the pixel plate (305) and the bottom charge plate (310) as the pixel plate (305) moves in response to electrostatic forces.

As previously introduced, the light modulator device (300) includes a plurality of bottom plate vias (340), interconnect vias (345), flexure vias (350), and pixel plate vias (360). The pixel plate is connected to the flexures through the pixel vias (360). The flexure vias (350) extend through the base mounting portion (400; FIG. 4) flexures (335; FIG. 4). As seen in FIGS. 5A–5B, the bottom plate vias (340) extend through a bottom oxide layer (560) where the bottom plate vias (340) are connected to a metal first source connection (570). The first source connection (570) is configured to be coupled to an external voltage source to provide voltage to the bottom charge plate (310).

FIGS. 5A–5B also show a second source connection (575). The interconnect vias (345) extend through the bottom oxide layer (560) to the second source connection (575). The interconnect vias (345) are also coupled to an intermediate charge plate (580) formed on the bottom oxide layer (560). The intermediate charge plate (580) in turn is coupled to the flexure vias (350). The flexure vias (350) form the inner portion of the base mounting posts (400; FIG. 4), such that a charge pathway is established from the second source connection (575), through the intermediate charge plate (580) and the base mounting posts (400; FIG. 4) to flexures (335; FIG. 4). As seen in FIG. 4, the base mounting posts (400) are coupled to the pixel plate mounting portion (420) by way of the span portion (410). Consequently, the charge pathway discussed extends from the second source connection (575) to the pixel plate (305; FIG. 5). In addition, the intermediate charge plate (580) is separated from the bottom charge plate (310) by gaps (590). The gaps (590) are sufficiently large to help ensure that the bottom charge plate (310) and the intermediate charge plate (580) will not be shorted.

Accordingly, the interconnect vias (345) and the flexure vias (350) are not stacked directly on top of each other. This configuration reduces the steepness of the side walls of each of the vias, as the flexure via (350) does not extend through the same area as the interconnect via (345). As a result, the shape and size of each via may be etched through a single layer during formation of the device. The result is a more robust process and resulting light modulator device, as will be discussed in more detail with reference to FIG. 6.

Method of Forming a Light Modulator Device

Figure 6A:
FIGS. 6A–6Q illustrate a method of forming a light modulator according to one exemplary embodiment.
Figure 6B:
Figure 6C:
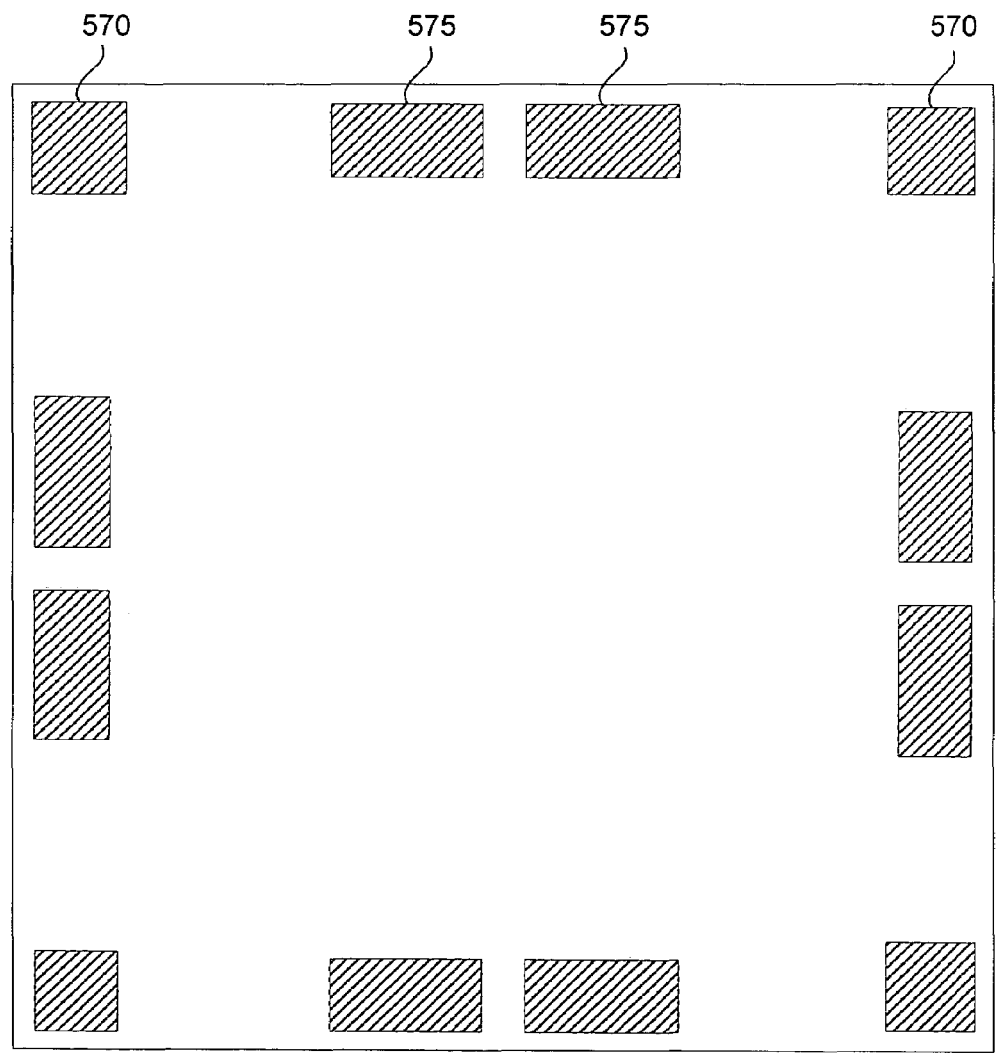
Figure 6D:
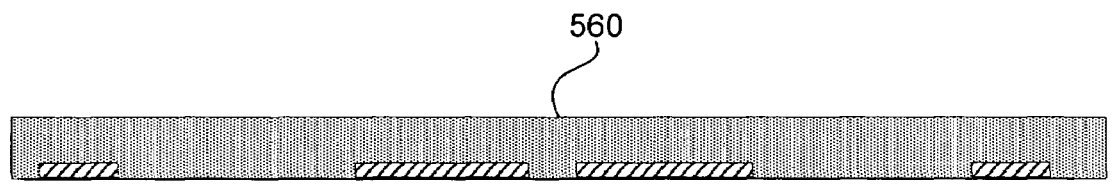
Figure 6E:
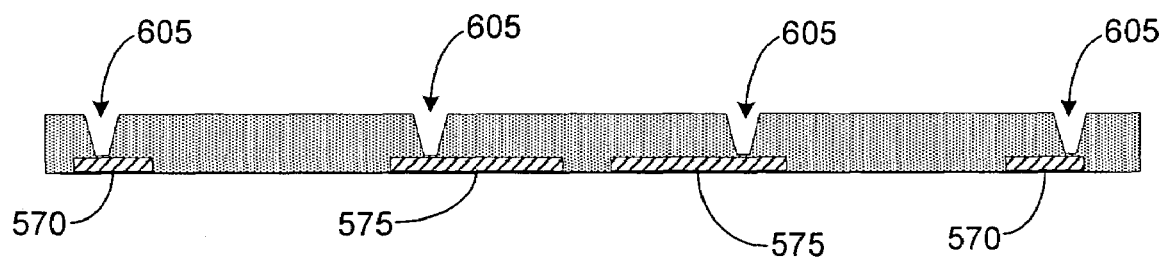
Figure 6F:
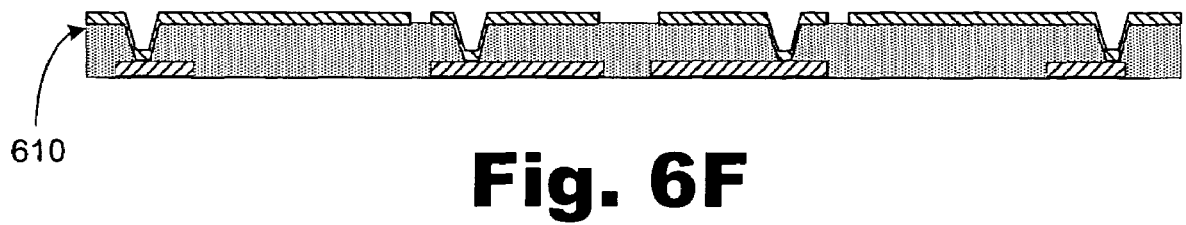
Figure 6G:
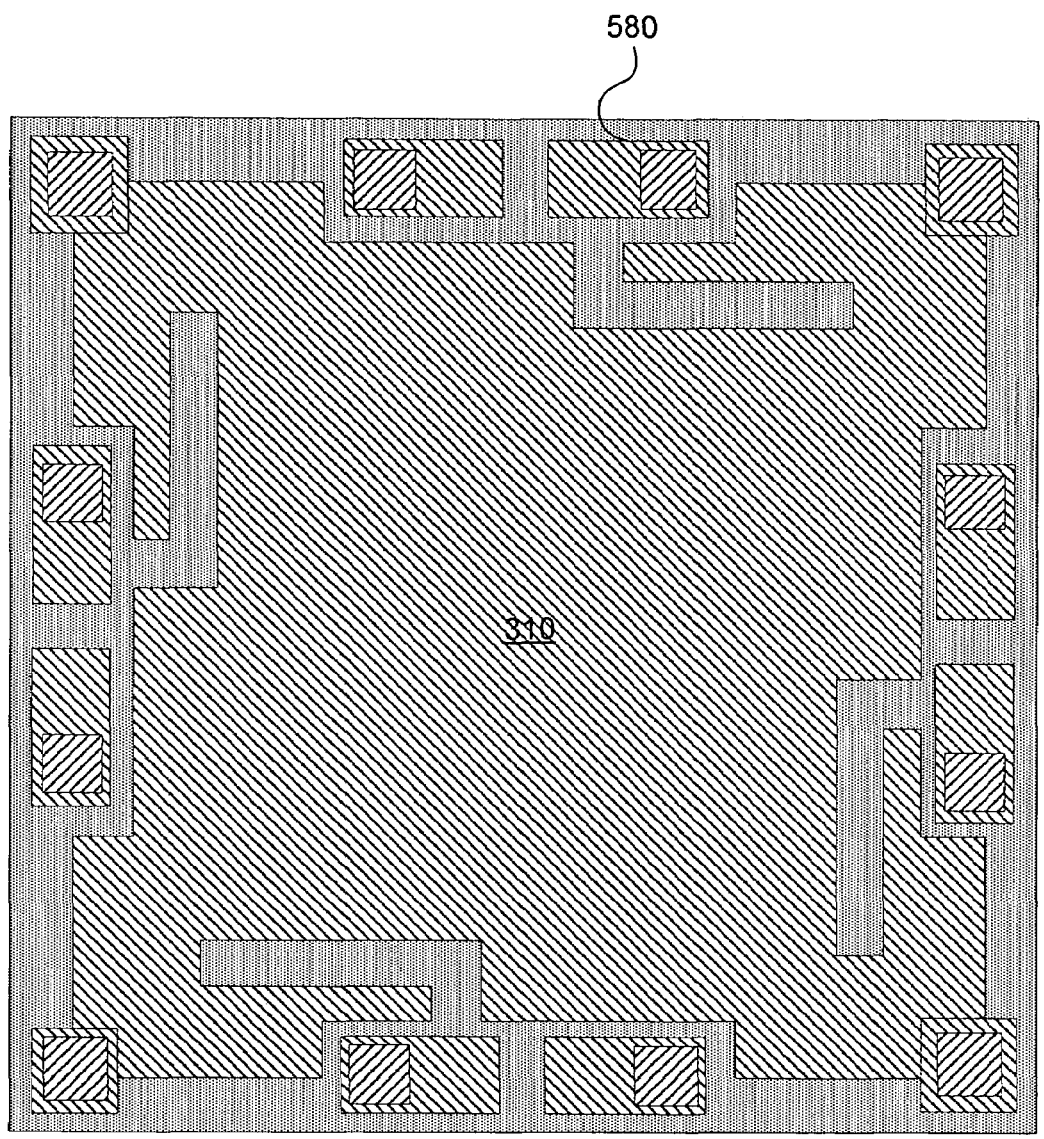
Figure 6H:
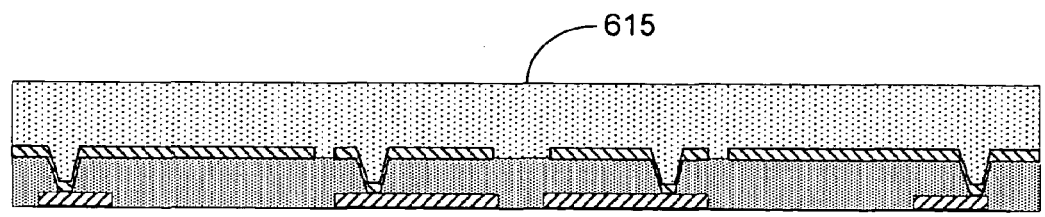
Figure 6I:
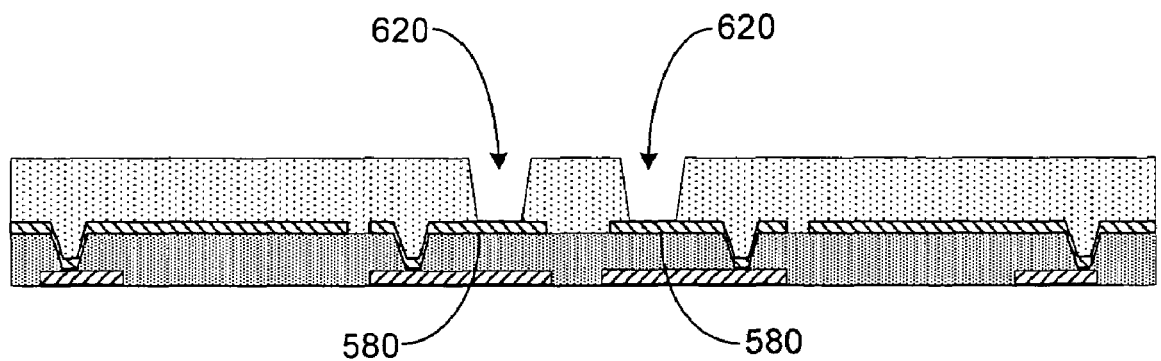
Figure 6J:
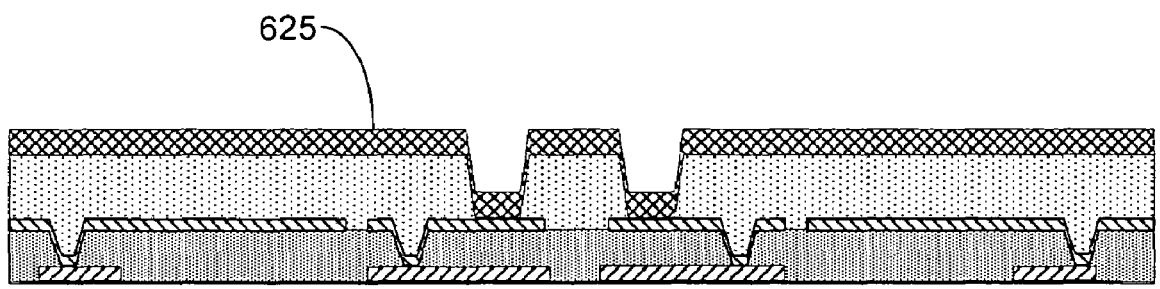
Figure 6K:
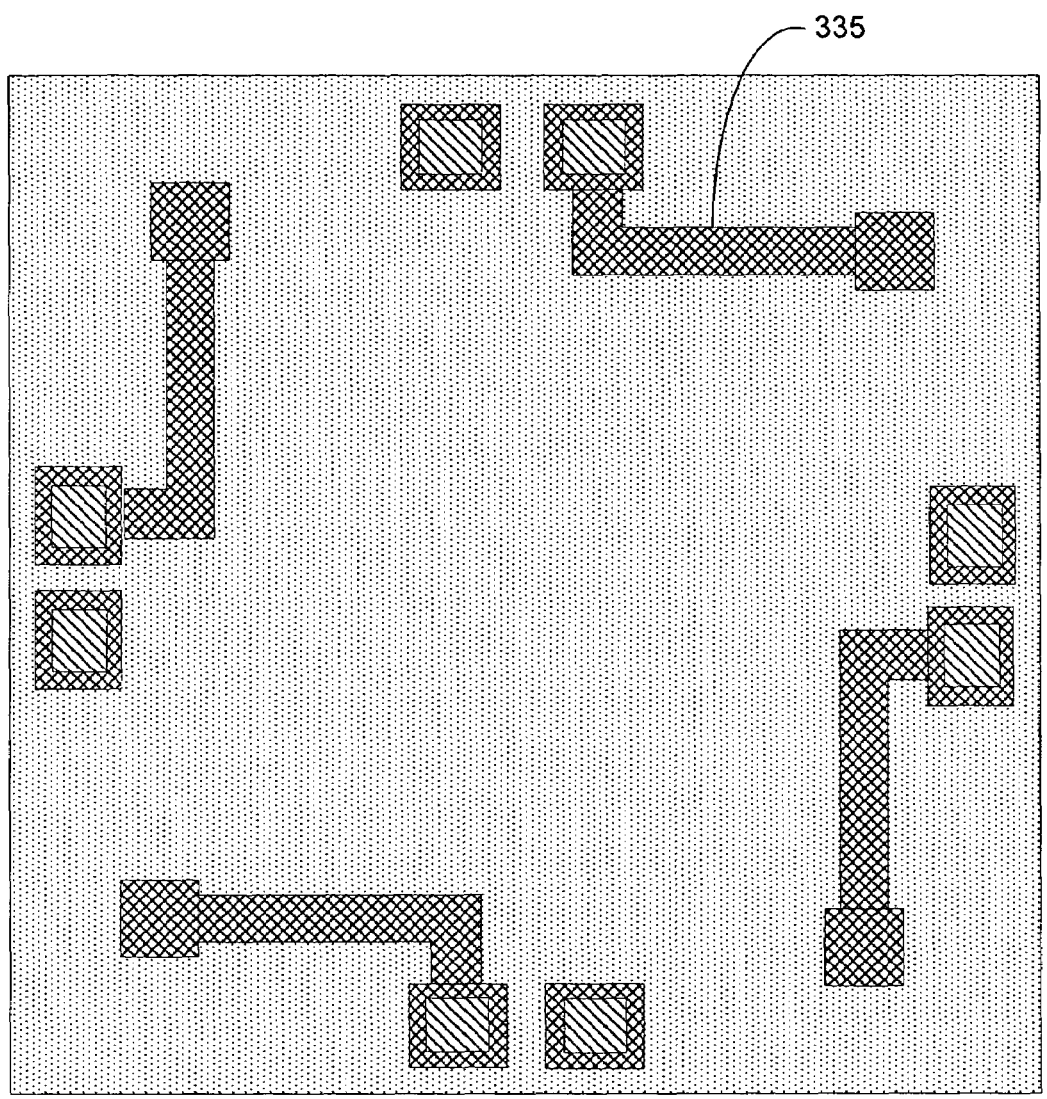
Figure 6L:
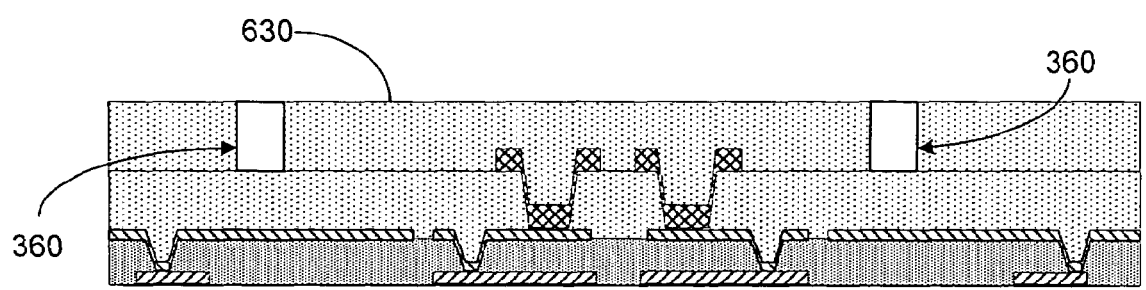
Figure 6M:
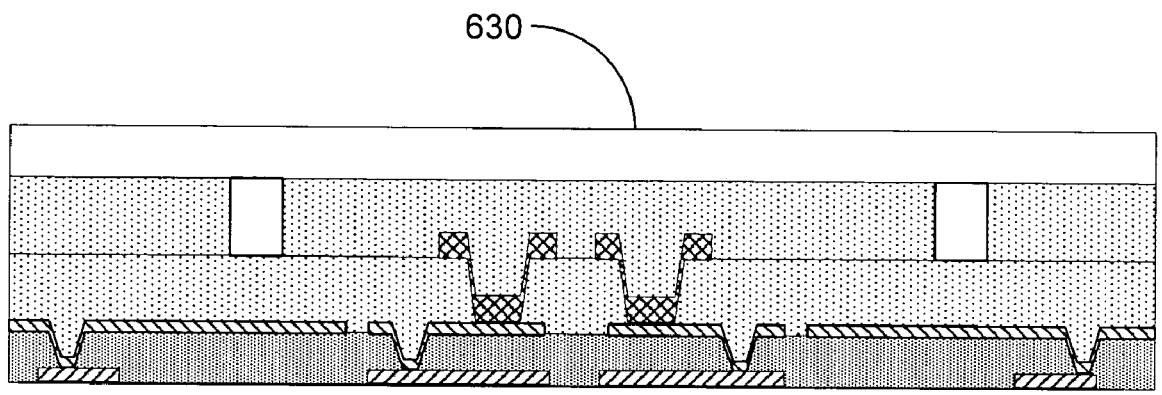
Figure 6N:
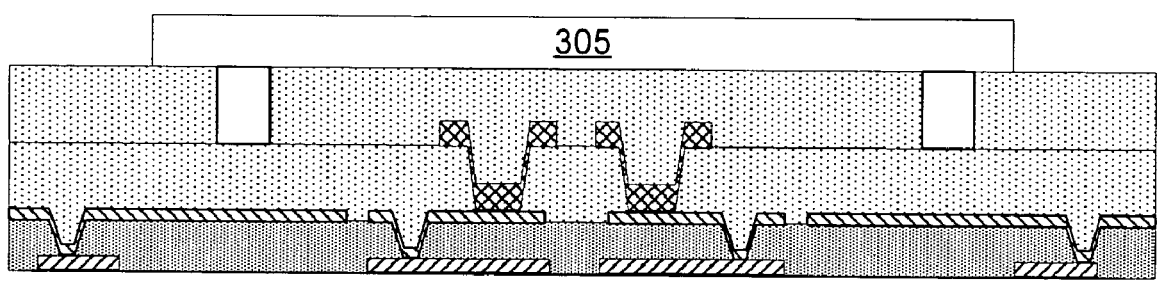
Figure 6O:
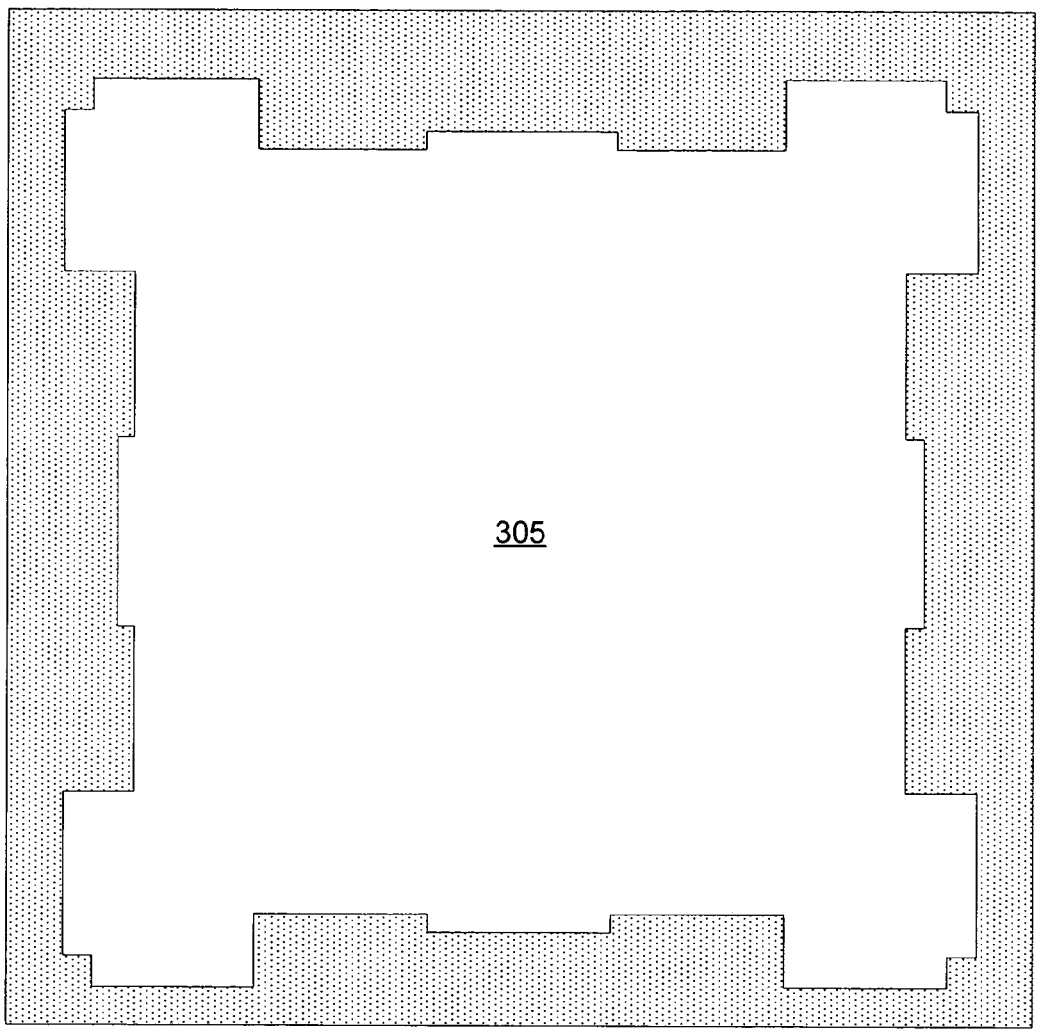
Figure 6P:
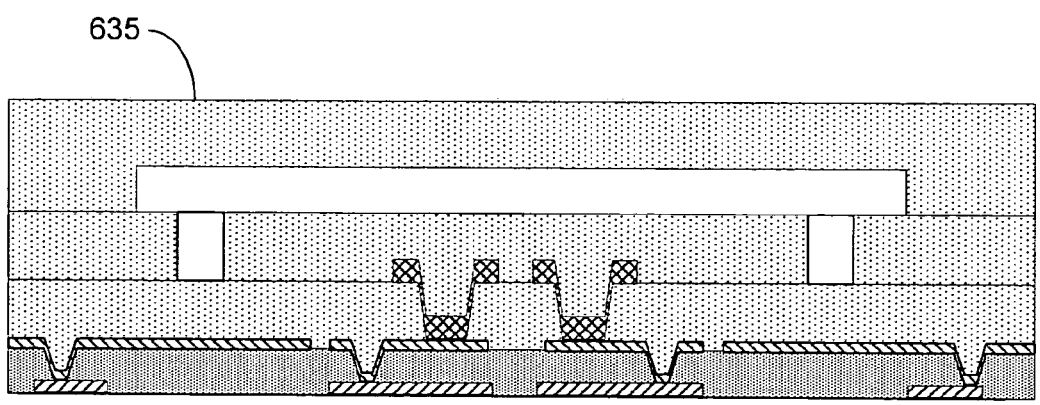
Figure 6Q:
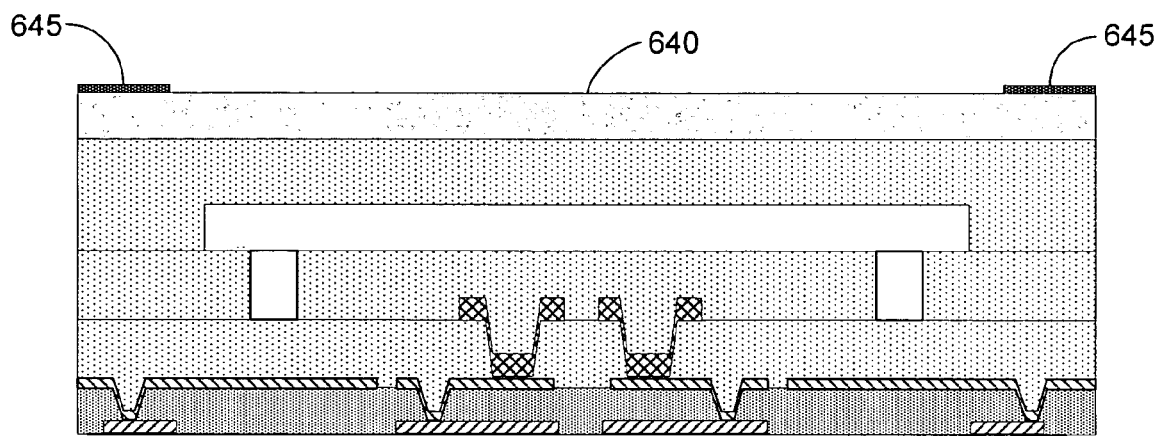

FIGS. 6A–6Q illustrate an exemplary method of forming a light modulator device. For ease of reference, the method will be discussed with respect to the formation and processing of layers of material. As shown in FIG. 6A, the method begins by forming a source connection layer (600). One such exemplary layer includes 50 Å Ti, 500 Å of TiN, and 1500 Å of AlCu on a substrate. Thereafter, the layer of metal material is processed to form the source connections (570, 575; FIGS. 6B–C). The source connection layer (600) is processed by applying a source connection photoresist pattern that corresponds to the final shapes of the source connections. The source connection layer is then etched to remove excess material, thereby leaving the finished bottom source connections (570, 575).

A bottom oxide layer (560), such as a TEOS layer, is formed on the remaining source connection layer, as is shown in FIG. 6D. One exemplary bottom oxide layer is approximately 1 µm thick. As shown in FIG. 6E, the bottom oxide layer (560) is then processed to form via pathways (605) that extend through the bottom oxide layer (560) and to the source connections (570, 575). In particular, a first via photoresist pattern is applied to the first bottom oxide layer (560) and the exposed areas are then etched through to the source connection layer. The exposed areas of the first via photoresist pattern correspond to the size, shape, and locations of the vias. These via pathways correspond to the first or bottom source vias and the interconnect vias, which are formed above the first metal source connections (570) and the second metal source connections (575) respectively.

FIGS. 6F and 6G illustrate the device after a bottom charge plate layer (610 has been deposited and etched. The deposition of the bottom charge plate layer causes a layer of material to be deposited in the via pathways (605; FIG. 6E), which are formed through the bottom oxide layer (560; FIG. 6D). Accordingly, an electrical connection is established between the source connection layer and the bottom charge plate layer by way of the vias. The bottom charge plate layer is then processed to form the bottom charge plate shown in FIGS. 6F–6G. This processing may include applying a bottom charge plate photoresist pattern and etching through the exposed areas to the bottom oxide layer (560). As the bottom charge plate layer is etched, the bottom charge plate (310) and the intermediate charge plate (580) are established in the bottom charge plate layer (610).

A first sacrificial layer (615; FIG. 6H) is then formed on the bottom charge plate layer (610). One exemplary first sacrificial layer (615; FIG. 6H) includes a 200 Å layer of SiN and a 3300 Å layer of a-Silicon. As shown in FIG. 6I, the first sacrificial layer (615; FIG. 6H) is then processed to form pathways (620) for flex plate via applying a flex plate via photoresist pattern to the first sacrificial layer and then etching through the first sacrificial layer (620) to the intermediate charge plates (580), which are part of the bottom charge plate layer (610; FIG. 6F).

As previously introduced, the flexures (335; FIG. 5) may include bumps (530-1; FIG. 5B) on the underside thereof. These bumps may be formed by forming voids or molds in the first sacrificial layer (615). These voids may be formed by applying a bump void photoresist pattern to the first sacrificial layer. A suitable bump void photoresist pattern may have voids therein corresponding to the size, shape, and location of the individual voids to be formed in the first sacrificial layer. The first sacrificial layer (615) would then be etched to a depth of approximately 500–1000 Å to form the voids. Accordingly, the first sacrificial layer may be processed to provide bumps on the underside of the flexures.

FIG. 6J shows the flexure layer (625). The flexure layer (625) is approximately 1200 Å thick and is substantially made up of TaAl. The flexure layer (625) is processed by applying a flexure photoresist pattern to the flexure layer (625) and etching through to the first sacrificial layer (615; FIG. 6H). The resulting flexure pattern, including the flexures (335) is shown in FIG. 6K.

A flexure space sacrificial layer (630) is then deposited on the flexure space sacrificial layer (625; FIGS. 6J–6K), as is shown in FIG. 6L. The flexure space sacrificial layer (625) includes approximately 3300 Å a-Si and 200 Å SiN material. The flexure space sacrificial layer (625) corresponds to the flexure space (520) shown in FIGS. 5A–5B. Pixel vias (360) are then etched into the flexure space sacrificial layer (625) to connect the pixel plate to the flexure. Accordingly, voids may be established in the flexure space sacrificial layer (625) for the formation of bumps (335; FIG. 5B) as previously described.

As seen in FIG. 6M, a pixel plate layer (630) is then formed on the flexure space sacrificial layer (625). The pixel plate layer is approximately 10,000 Å thick and is substantially made up of AlCu. After the pixel plate layer (630) is deposited, it is processed by applying a pixel plate photoresist pattern thereto an etching through to the flexure space sacrificial layer (625). The resulting pixel plate (305) is shown in FIGS. 6N and 6O.

Once the pixel plate (305) has been formed, a second sacrificial layer (635; FIG. 6P) is formed on the pixel plate layer (630). One second sacrificial layer includes a layer of SiN that is approximately 200 Å thick and a layer of a-Si that is approximately 2800 Å thick. Thereafter, a top charge plate layer (640) is formed on the second sacrificial layer (630), as shown in FIG. 6P. Once this structure has been formed, the first sacrificial layer (615), the flexure space sacrificial layer (625), and the second sacrificial layer (635) may be removed, such as by selective etching. A third electrical connection (645) is then formed on top of the top charge plate (635) and coupled to a third voltage source.

The top charge plate (640) and the pixel plate (305) may be coupled to the same voltage source or sources at the same voltage level. In such a case, there is little or no voltage difference between the top charge plate (640) and the pixel plate (305) such that little or no electrostatic attraction exists between the top charge plate (640) and the pixel plate (305). Further, the top charge plate (640) and the pixel plate (305) may be coupled to voltage sources at different voltage levels, such that an electrostatic attraction may be established between the top charge plate (640) and the pixel plate (305).

Accordingly, the present method provides for the formation of a light modulator device in which the flexures are located substantially below the pixel plate. Additionally, the present method provides for the formation of a light modulator device in which the optical gap and the electrostatic gap are separated. Further, the present method provides for the formation of a light modulator device that includes stiction abatement mechanisms, such as bumps located on the underside of the pixel plate, on the underside of the flexures, or both. In addition, the present method provides for the rapid and robust formation of such light modulator device by allowing the via structures to be unstacked. Thus far, a light modulator device according to one exemplary embodiment has been discussed. Several other configurations are possible, including several different flexure structures and via configurations. Some of these possible configurations will now be discussed in more detail.

Alternative Embodiments

Figure 7:
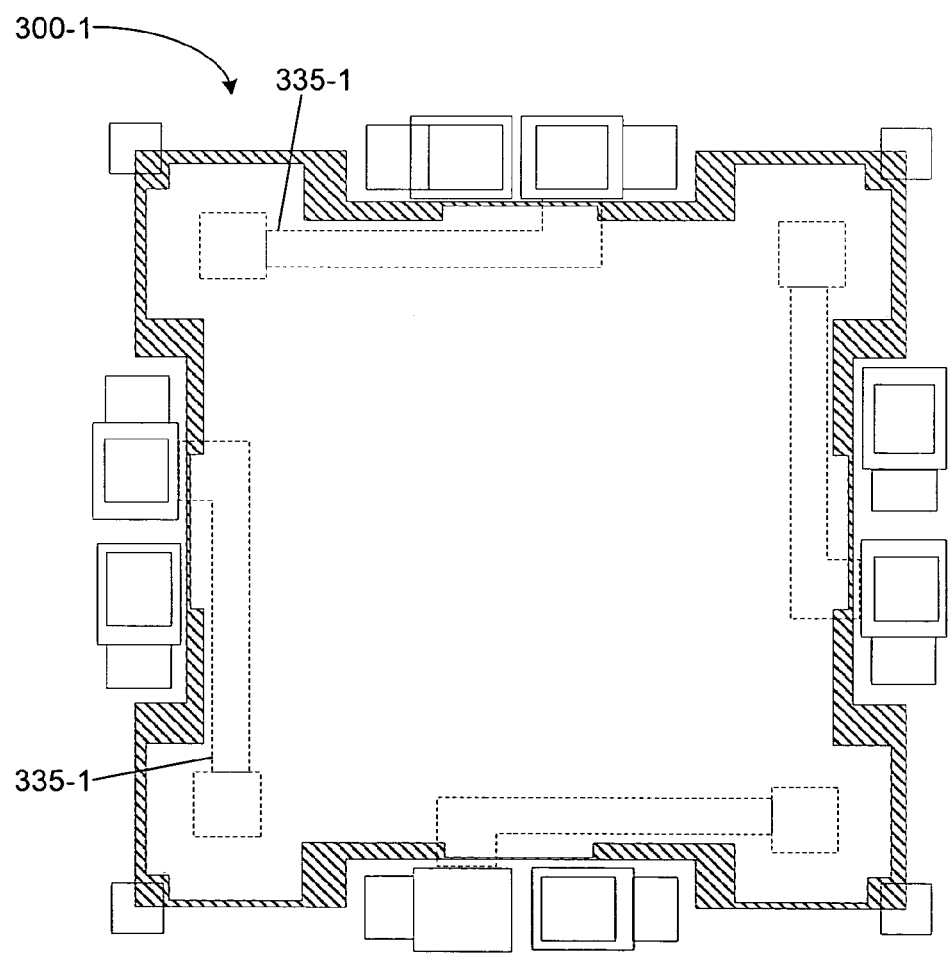
FIG. 7 illustrates a top view of a light modulator device having a hidden flexure structure according to one exemplary embodiment.

FIG. 7 illustrates another light modulator device (300-1) according to one exemplary embodiment. The light modulator device (300-1) includes elongated flexures (335-1). For example, the flexures may be approximately 7.8 µm in length and 1.0 µm wide. The use of elongated flexures (335-1) may reduce the voltage required to operate the flexures and reduce the strain in the flexures themselves the operation of the light modulator device (300-1).

Figure 8:
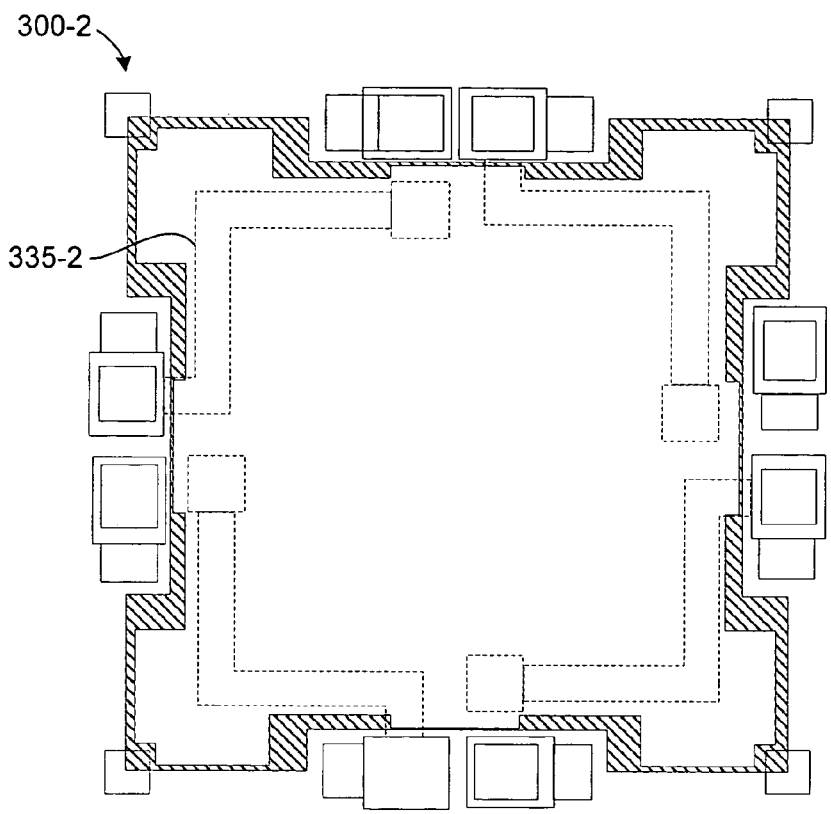
FIG. 8 illustrates a top view of a light modulator device having a hidden flexure structure according to one exemplary embodiment.

FIG. 8 illustrates another light modulator device (300-2) according to one exemplary embodiment in which the flexures (335-2) have been further elongated. In particular, the flexures (335-2) include an additional bend, such that the flexures are elbow-type flexures. As a result, the total length of the flexures (335-2) may be approximately 9.5 µm with a width of approximately 1.0 µm. Accordingly, the dimensions of the flexures may be varied as desired. Further, the configuration of the bottom charge plate may be varied, as will now be discussed in more detail.

Figure 9:
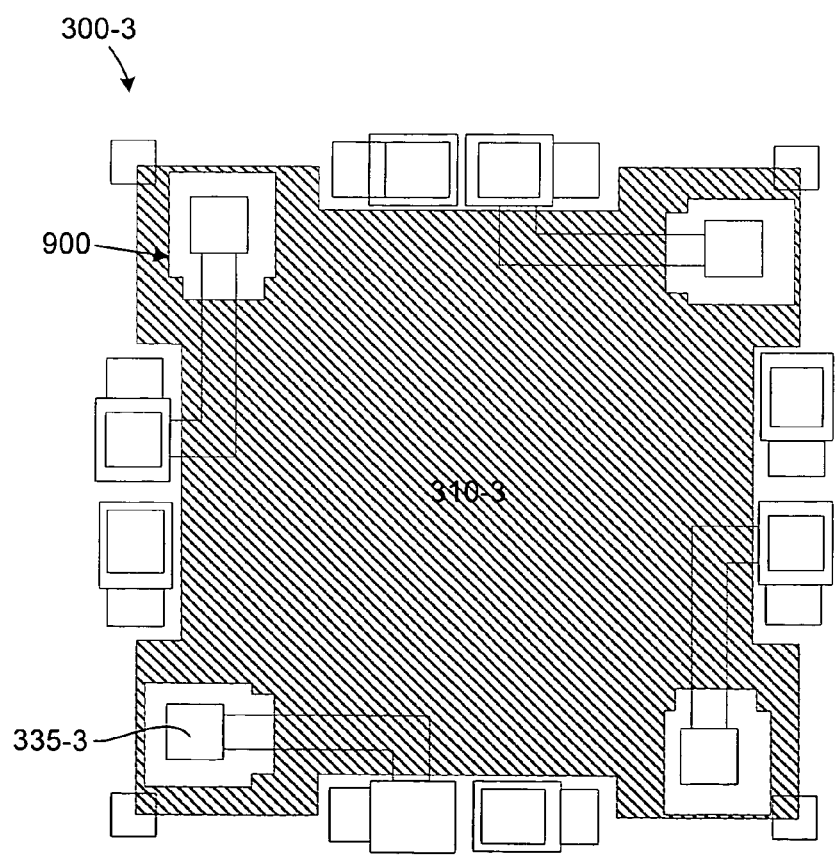
FIG. 9 illustrates a top view of a light modulator device having cutouts defined in a bottom charge plate according to one exemplary embodiment.

FIG. 9 illustrates a top view of a light modulator device (300-3) in which the top charge plate and the pixel plate have been removed to focus on the bottom charge plate (310-3) and its interaction with the flexures (335-3). The bottom charge plate (310-3) has cutouts (900) defined therein. These cutouts (900) allow the flexures to contact the bottom oxide layer (560; FIG. 6) while minimizing or eliminating contact between the flexures (335-3) and the bottom charge plate (310-3). Minimizing contact between the bottom charge plate (310-3) may further reduce stiction or other effects.

Figure 10:
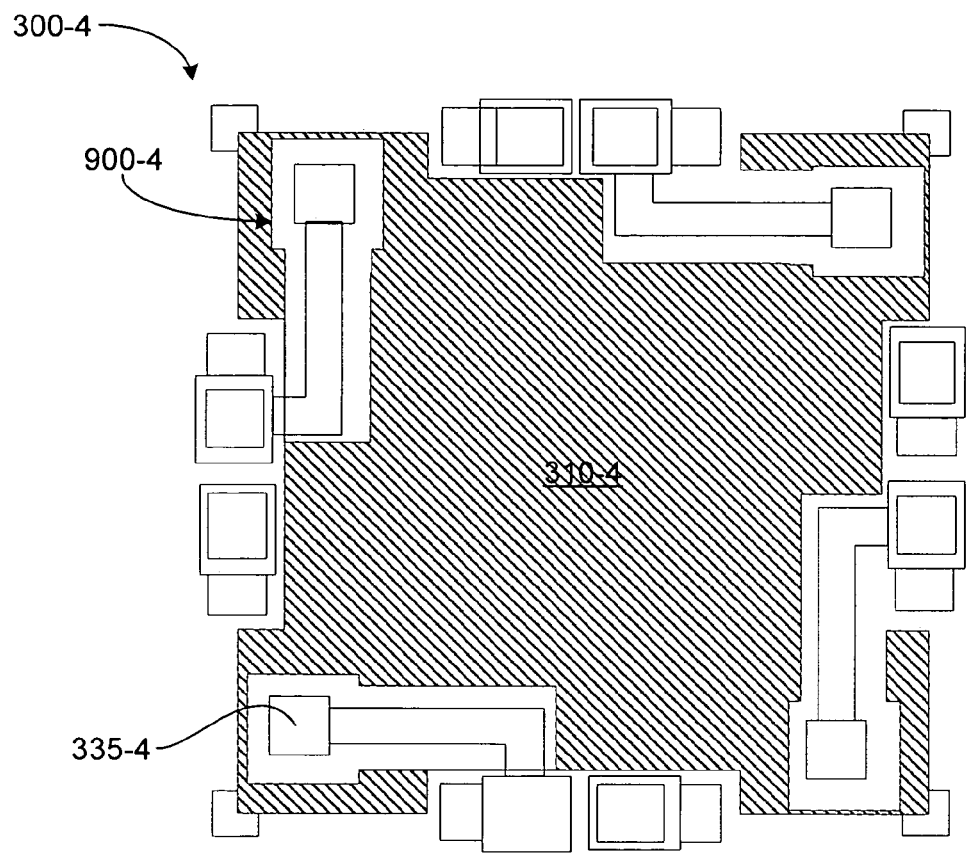
FIG. 10 illustrates a top view of a light modulator device having cutouts defined as a bottom charge plate according to one exemplary embodiment.

Further, a light modulator device (300-4) according to another exemplary embodiment, makes use of larger cutouts (900-4). As shown in FIG. 10, larger cutouts (900-4) may be defined in the bottom charge plate (310-4). The use of larger cutouts (900-4) further reduces the possibility that the flexures (335-4) will come into contact with the bottom charge plate. Accordingly, bottom charge plates may be formed with cutouts to help reduce the possibility that the flexures of a light modulator device will come into contact with the bottom charge plate. In addition, while two exemplary cutouts have been shown in use with one particular type of flexure, cutouts may be provided with any number of flexure structures.

Light Modulator Devices with Pixel Extension Members

Figure 11:
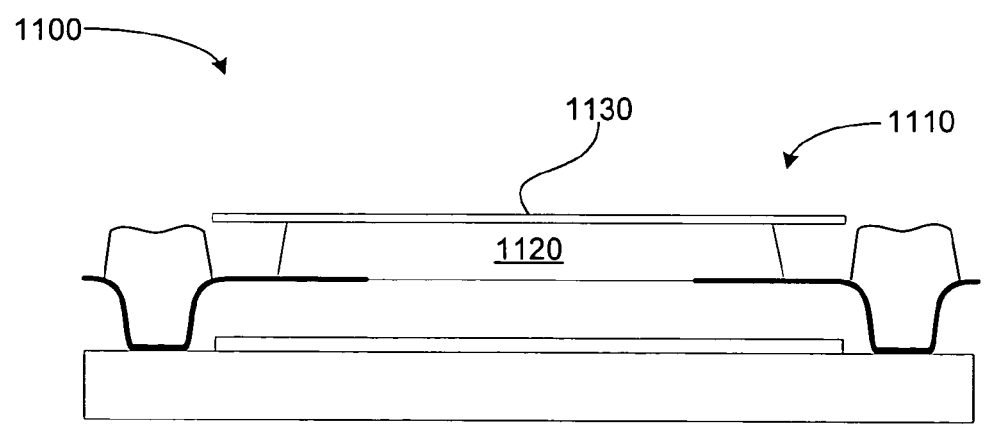
FIG. 11 illustrates a schematic view of a light modulator device (1100) according to one exemplary embodiment.

FIG. 11 illustrates a schematic view of a light modulator device (1100) according to one exemplary embodiment. In particular, the light modulator device (1100) includes a movable pixel element (1110) that includes a pixel plate (1120) and a pixel extension member (1130). The pixel extension member (1130) increases the effective size of the movable pixel element (1110).

The spaces between the pixel members (1130) and the adjacent pixel plates (1120) can be made very small. The increase in aperture ratio due to the pixel extension member (1130) may enable pixel sizes to be reduced. In particular, similar performance can be attained for a given application by devices having a smaller overall size because the effective size of the of the movable pixel element (1110) remains the same.

Further, the performance characteristics of the movable pixel element (1110) such as reflectivity, may be adapted to suit a variety of situations. For example, the electrical, chemical, or mechanical properties of the pixel plate (1120) and the pixel extension member (1130) may be adapted separately. For example, the extension layer may include metallic materials, such as aluminum or silver for high reflectivity. Further, the pixel plate may be formed of a different material, such as an aluminum alloy or other material having a relatively high modulus, good corrosion resistance characteristics, smooth structure, and chemical mechanical polish (CMP) characteristics.

The pixel extension member (1130) may be composed of a multilayer film to allow protection of the film from interlayer diffusion, environmental attack, or from subsequent processing; or to optimize its optical characteristics. For example, oxides or nitrides may be used to protect silver from tarnishing or aluminum from interdiffusing with silicon.

Accordingly, the pixel extension member (1130) makes use of other regions that serve another purpose such as interpixel spaces that contain flexures. Since the effective size of the pixel is set by the pixel extension member (1130) instead of the movable pixel first layer, the first layer can be further modified to increase flexure to first layer critical dimension and alignment tolerances, or to allow longer flexures. For this type of design, aspect ratio can be increased from 75% to over 85%.

The light modulator device (1100) discussed with reference to FIG. 11 may be formed using deposition/photo/etch processes, such as those discussed with reference to FIGS.

6A–6Q. Further, the exemplary pixel extension member (1130) may be formed by any suitable means.

In conclusion, several micro-electro mechanical (MEM) light modulator devices have been described herein that have relatively large pixel plates as compared to the total surface area of the light modulator device. The light modulator devices described herein include optical and electrostatic gaps that are separated. The separation of the optical and electrostatic gap allows additional flexibility and device performance enhancements in the light modulator devices. This configuration also allows for more degrees of freedom in the flexure design and for a higher percentage of pixel area as compared to the total surface area of the light modulator device. Increased pixel plate area percentage may increase the optical performance of the device. In addition, such a configuration allows for the use of longer flexures for a given pixel size. Longer flexures may provide lower flexure strain designs that can provide higher reliability and require lower actuation voltage. The lower strain, lower activation voltage designs enable smaller pixel sizes that can lead to lower cost devices. Finally, moving the flex out of the pixel streets removes the possibility of flexure to pixel contact binding, which occurs in the original architecture.

The preceding description has been presented only to illustrate and describe the present method and apparatus. It is not intended to be exhaustive or to limit the disclosure to any precise form disclosed. Many modifications and variations are possible in light of the above teaching. It is intended that the scope of the disclosure be defined by the following claims.

What is claimed is:

1. A light modulator device, comprising:
   a bottom charge plate;
   a pixel plate including a reflective top surface supported by a plurality of flexures, wherein said plurality of flexures are located substantially below said reflective top surface, wherein each of said flexures includes a span portion and a pixel plate mounting portion, and each of said span portions is coupled to a base mounting portion adjacent to the bottom charge plate; and
   a top plate separated from the pixel plate by an optical gap.

2. The light modulator device of claim 1, and further comprising an electrostatic gap defined between said pixel plate and said bottom charge plate.

3. The light modulator device of claim 2, wherein said electrostatic gap includes a first sacrificial space between said bottom charge plate and a flexure space between said flexure and said pixel plate.

4. The light modulator device of claim 3, wherein said first sacrificial space is larger than said flexure space.

5. The light modulator device of claim 4, and further comprising at least one bump formed on an underside of said pixel plate.

6. The light modulator device of claim 4, wherein said first sacrificial space is smaller than said flexure space.

7. The light modulator device of claim 2, and further comprising a second electrostatic gap defined between said top plate and said pixel plate.

8. The light modulator device of claim 1, wherein said plurality of flexures comprises four flexures and said flexures are arranged in a pinwheel pattern.

9. The light modulator device of claim 1, wherein said span portion is approximately 5.4 µm long by 1.0 µm wide.

10. The light modulator device of claim 1, wherein said span portion is approximately 7.8 µm long by 1.0 µm wide.

11. The light modulator device of claim 1, wherein said span portion is an elbow-type span portion having an overall length of approximately 9.5 µm and a width of approximately 1.0 µm.

12. The light modulator device of claim 1, and further comprising a cutout defined in an area of said bottom charge plate below said pixel plate mounting portion.

13. The light modulator device of claim 12, and further comprising a cutout defined in an area of said bottom charge plate below said pixel plate mounting portion and said span portion.

14. The light modulator device of claim 1, and further comprising a plurality of first source connections, a plurality of second source connections, and a bottom oxide layer, said first source connections being coupled to said bottom charge plate and said second source connections being coupled to said pixel plate.

15. The light modulator device of claim 14, and wherein a connection between each of said second source connections and said pixel plate includes an interconnect via, an intermediate charge plate, and a pixel plate via, said interconnect via extending through said bottom oxide layer and coupling said second source connection to said intermediate charge plate, and said pixel plate via coupling said intermediate charge plate to said flexure, said flexure being coupled to said pixel plate.

16. The light modulator device of claim 15, wherein said pixel plate via is unstacked from said interconnect via.

17. A light modulator device, comprising:
    a bottom charge plate;
    a pixel plate including a reflective top surface supported by at least one flexure, wherein said flexure is located substantially below said reflective top surface, wherein said pixel plate includes at least one bump formed on an underside of said pixel plate, wherein said flexure comprises a base mounting post and said bump is formed near said base mounting post; and
    a top plate separated from the pixel plate by an optical gap;
    wherein an electrostatic gap is defined between said pixel plate and said bottom charge plate wherein the electrostatic gap includes a first sacrificial space between said bottom charge plate and a flexure space between said flexure and said pixel plate, and wherein said first sacrificial space is larger than said flexure space.

18. The light modulator device of claim 17, and further comprising a plurality of flexures each having a base mounting post and a plurality of bumps formed on said underside of pixel plate near said base mounting posts.

19. A light modulator device, comprising:
    a bottom charge plate;
    a pixel plate including a reflective top surface supported by at least one flexure, wherein said at least one flexure is located substantially below said reflective top surface, wherein said at least one flexure has at least one bump formed on an underside of said flexure; and
    a top plate separated from the pixel plate by an optical gap;
    wherein an electrostatic gap is defined between said pixel plate and said bottom charge plate wherein the electrostatic gap includes a first sacrificial space between said bottom charge plate and a flexure space between said at least one flexure and said pixel plate, and wherein said first sacrificial space is smaller than said flexure space.

20. The light modulator device of claim 19, and further comprising a plurality of flexures, wherein each flexure has at least one bump formed on an underside thereof.

21. A light modulator device, comprising:
- a bottom charge plate;
- a pixel plate supported by a plurality of flexures, wherein said plurality of flexures are located substantially below said pixel plate and wherein the pixel plate includes at least one bump formed on an underside of the pixel plate and the each of the plurality of flexures includes a base mounting post and the at least one bump is formed near the base mounting post;
- a top plate;
- a charge gap defined between said bottom charge plate and said pixel plate;
- a flexure space less than the charge gap defined between the plurality of flexures and the pixel plate; and
- an optical gap and electrical gap defined between said top plate and said pixel plate.

22. The device of claim 21, and further comprising first and second source connections coupled to said bottom charge plate.

23. The device of claim 22, wherein each base mounting post is coupled to an intermediate charge plate, said intermediate charge plate being coupled to interconnect vias, said interconnect vias being coupled to either the first or second source connection, and wherein each base mounting post is offset from said interconnect vias.

24. The device of claim 21, wherein said top plate and said pixel plate are configured to be maintained at a substantially similar voltage level.

25. The device of claim 24, wherein a neutral state position of said pixel plate substantially corresponds to a black state value of said optical gap.

26. The device of claim 21, wherein said bottom charge plate includes voids defined therein for preventing contact between said flexures and said bottom charge plate.

27. A method of forming a light modulator device, comprising:
- forming a bottom charge plate;
- forming a first sacrificial layer on said bottom charge plate;
- forming flexures on said first sacrificial layer wherein said flexures include a base mounting post;
- forming a pixel plate above said flexures wherein the pixel plate includes at least one bump formed on an underside of said pixel plate and near one of said base mounting post; and removing said first sacrificial layer such that said flexures are substantially below said pixel plate.

28. The method of claim 27, and further comprising processing said first sacrificial layer to establish via pathways.

* * * * *